United States Patent [19]
Ott et al.

[11] Patent Number: 5,517,932
[45] Date of Patent: May 21, 1996

[54] SCALLOPED CLOSING WHEEL FOR A SEEDING MACHINE

[75] Inventors: David F. Ott, Sherrard; Alfred D. Yoder, Geneseo, both of Ill.

[73] Assignee: Deere & Company, Moline, Ill.

[21] Appl. No.: 226,156

[22] Filed: Apr. 11, 1994

[51] Int. Cl.⁶ .................................................. A01C 5/00
[52] U.S. Cl. ........................... 111/193; 111/166; 172/533; 172/604
[58] Field of Search .................... 111/190, 191, 111/192, 193, 194, 166, 169; 172/604, 538, 701, 574, 575, 176, 604

[56] References Cited

U.S. PATENT DOCUMENTS

| | | |
|---|---|---|
| 2,331,819 | 6/1941 | West . |
| 2,668,490 | 2/1954 | Oehler et al. . |
| 2,771,044 | 11/1956 | Putifer .................................. 111/193 X |
| 2,842,078 | 7/1958 | Immesoete .............................. 111/194 |
| 2,924,189 | 2/1960 | McLeod .............................. 111/193 X |
| 3,122,111 | 2/1964 | Taylor ..................................... 172/604 |
| 3,175,524 | 3/1965 | Kappelmann . |
| 3,220,368 | 11/1965 | Gandrud . |
| 3,610,185 | 10/1971 | Scarborough . |
| 4,070,974 | 1/1978 | Stacy . |
| 4,122,974 | 10/1978 | Harbert et al. ...................... 111/904 X |
| 4,158,392 | 6/1979 | Belanger . |
| 4,377,979 | 3/1983 | Peterson et al. ..................... 172/604 X |
| 4,723,495 | 2/1988 | Dietrich et al. ...................... 111/192 X |

FOREIGN PATENT DOCUMENTS

| | | |
|---|---|---|
| 1902125 | 1/1968 | Germany . |
| 0088897 | 2/1983 | Germany . |

OTHER PUBLICATIONS

Farm Show Publication entitled "New & Improved" Trash Clearing, Closing Wheels.
John Deere Operators Manual OM–H138093 Issue F8, entitled "7300 MaxEmerge 2 Integral Planters", cover and pp. 95–98, published in U.S.A., 1988.
John Deere Operators Manual OM–H138100 Issue F8, entitled "7300 Vertical–Fold MaxEmerge 2 Planters", cover and p. 60–15, published in U.S.A., 1988.

Primary Examiner—Terry Lee Melius
Assistant Examiner—Victor Batson

[57] ABSTRACT

A closing wheel for an agricultural seeding machine. The closing wheel comprises a circular disc having a series of radially extending scallops or cavities on the furrow facing side of the closing wheel. The scallops or cavities extend to the circumferential edge of the disc forming a wavy or castellated edge. The circumferential edge is beveled away from the furrow facing side of the closing wheel. The disc is also provided with a central aperture for receiving a bearing assembly for rotatively mounting the disc onto a planter frame.

6 Claims, 2 Drawing Sheets

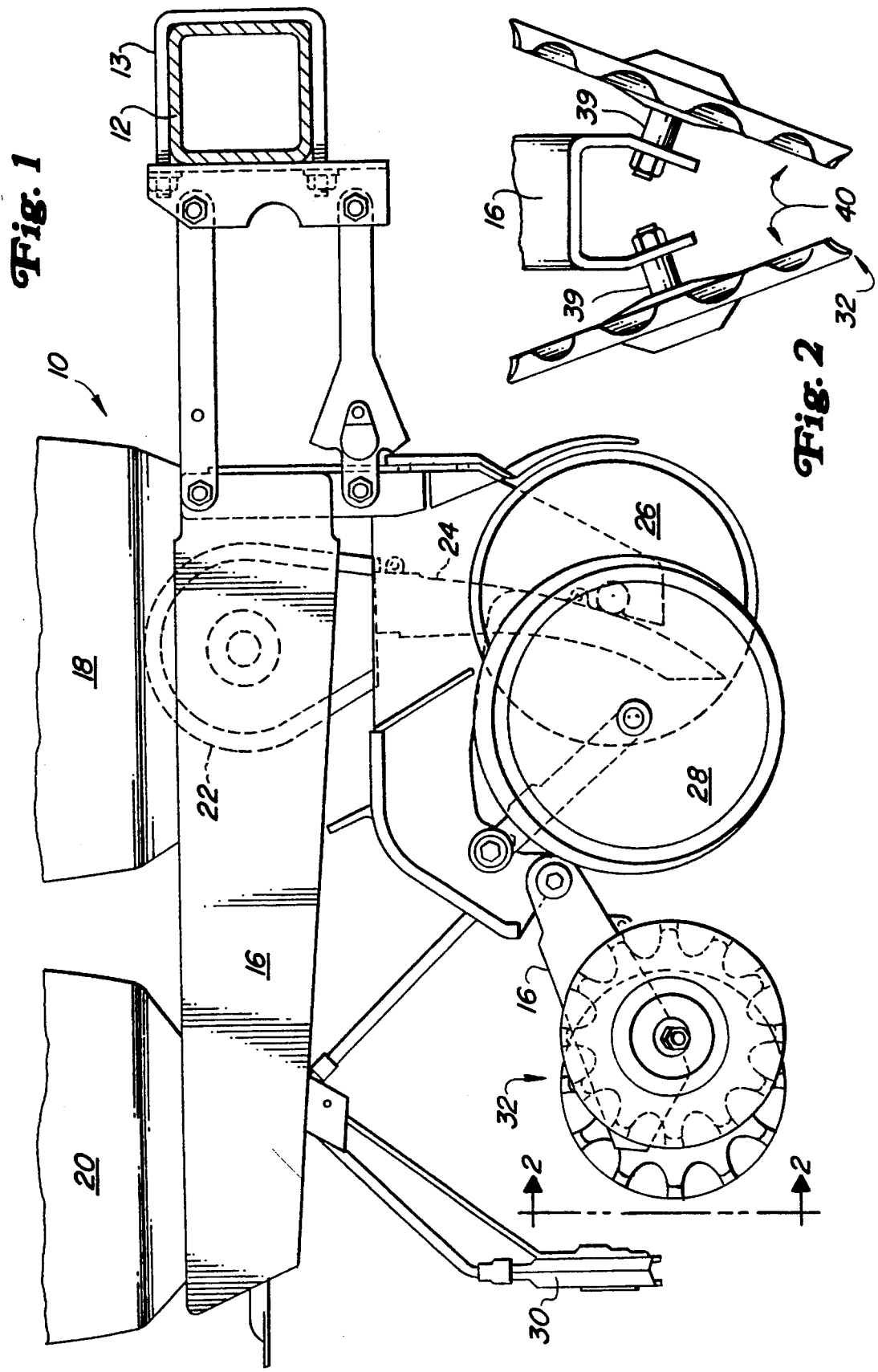

SCALLOPED CLOSING WHEEL FOR A SEEDING MACHINE

BACKGROUND OF THE INVENTION

1. Field of the Invention

The invention is directed to closing wheels for an agricultural seeding machine, wherein the closing wheels have a furrow facing side that is provided with a series of radially extending scallops or cavities that are adjacent to the circumferential edge.

2. Description of the Prior Art

Modern agricultural seeding machines are provided with a seed meter for controlling the rate at which seed is applied to a field, and a furrow opener for opening a furrow in the field to which seed from the seed meter is applied. Following the furrow opener are seed firming wheels, press wheels and/or closing wheels. These wheels firm the soil around the seed to obtain good seed-to-soil contact.

Seed firming wheels follow the furrow openers running in the furrow to press the seed into the bottom of the furrow before the seed is covered by closing the furrow. Press wheels are used to firm the soil after the seed has been covered by closing the furrow. Closing wheels serve the dual purpose closing the furrow and firming the seed bed. Depending on soil conditions, the operator may adjust the downforce applied by the closing wheels. In addition, in some tough conditions, heavy duty closing wheels having a beveled circumferential edge may be used.

Various configurations of press wheels and closing wheels have been proposed. Some examples of press wheels are disclosed in U.S. Pat. Nos. 3,220,368, 2,668,490, 3,175,524, 3,610,185 and 4,158,392. Of particular interest is the press wheel disclosed in U.S. Pat. No. 4,070,974 which discloses a press wheel having a peripheral edge that is provided with oppositely turned curved segments.

When planting in wet plastic soils it can be difficult to properly close a seed trench. Conventional closing wheels may give a false closing appearance in these soils and leave a tunnel above the seed. If the soil is not firm around the seed, the soil will dry and crack open above the seed causing poor germination and population. One proposal to overcome this problem are trash clearing closing wheels, that are in the shape of rotary hoes.

SUMMARY

It is an object of the present invention to provide closing wheels for an agricultural seeding machine that provides good seed-to-soil contact in adverse or no-til conditions.

The closing wheel of the present invention comprise a circular disc having a central aperture for receiving a bearing for rotatively mounting the closing wheel to the seeding machine behind the furrow opener. The circular disc has a furrow facing side which is provided with a series of radially extending scallops or cavities that extend to the circumferential edge of the disc. These scallops or cavities form a wavy or castellated inner circumferential edge which engages the soil. A circumferential surface is formed between the wavy inner circumferential edge and the circular outer circumferential edge. The circumferential surface is bevelled away from the furrow facing side.

The scallops or cavities on the closing wheel provide an alternating force on the seed trench wall to shear the soil and move it laterally to eliminate the tunnel. This force firms the soil around the seed, removing air pockets, greatly improving germination and population, while leaving the soil surface loose and less susceptible to crusting.

BRIEF DESCRIPTION OF THE DRAWINGS

FIG. 1 is a side view of a row crop planting unit having closing wheels of the subject invention.

FIG. 2 Is a rear view of the closing wheels taken along line 2—2 in FIG. 1.

DETAILED DESCRIPTION

Figure 4:
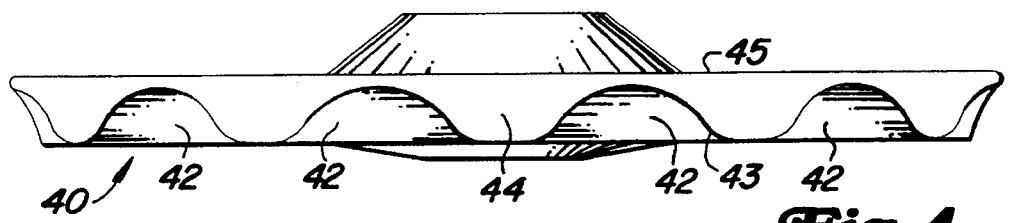
FIG. 4 is a front view of a closing wheel taken along line 4—4 in figure 3.

FIG. 1 illustrates a row crop planting unit 10 that is mounted to toolbar 12 by U-bolts 13. Parallel linkage 14 extends between toobar 12 and the planting unit 10. The frame 16 of the planting unit supports a seed hopper 18 and a granular pesticide hopper 20. Seed in the seed hopper 18 is directed to seed meter 22 which controls the rate of application of the seed. The seed is taken from the seed meter by seed tube 24 and directed to a furrow formed by furrow opener 26. Gauge wheels 28 control the depth of the furrow formed by the furrow opener. The granular pesticide hopper directs dry granular chemical to a chemical meter, not shown, which in turn directs the pesticide to applicator assembly 30. All of the above described elements are relatively conventional. The subject invention is directed to the closing wheels. Although the closing wheels are illustrated as being mounted on a row crop planting unit, they may also be employed on grain drills, pneumatic seeders and other seeding machines to close furrows formed by those machines.

A pair of closing wheels 32 are rotatively mounted to the frame 16. They are located directly behind and on either side of the furrow formed by the furrow opener 26. Although they are illustrated as being in a fore-aft staggered relationship, the closing wheels may also be mounted in a side-by-side relationship.

Figure 5:
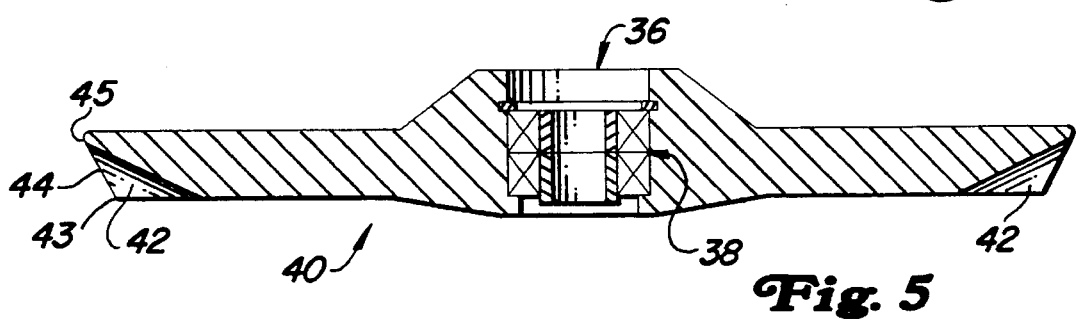
FIG. 5 is a cross sectional view of the closing wheel taken along line 5—5 in FIG. 3.
Figure 3:
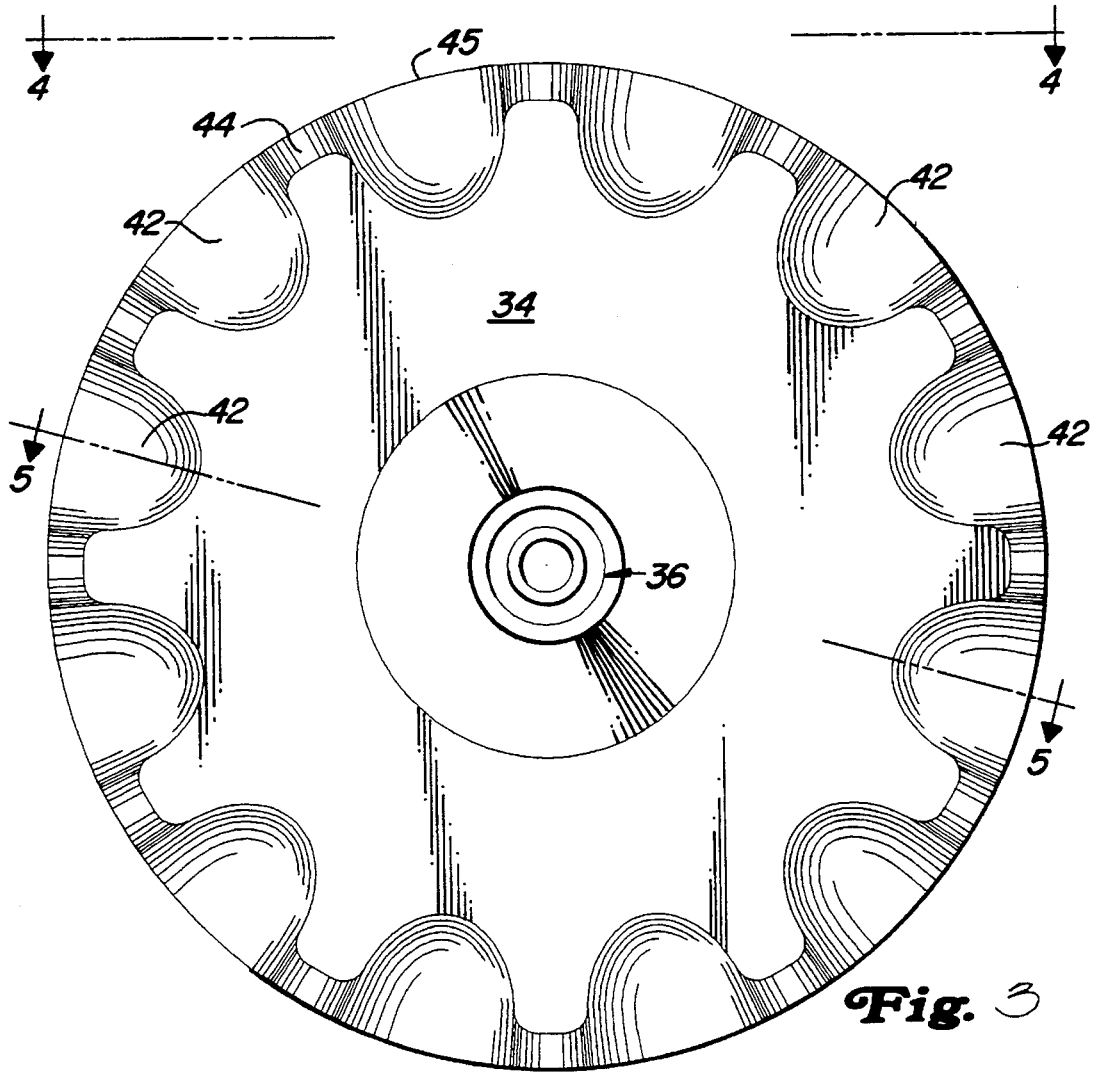
FIG. 3 is a side view of one closing wheel.

As best illustrated in FIGS. 3–5, each closing wheel comprises a circular disc 34 having a central aperture 36. The central aperture is designed to receive bearing 38 for rotatively mounting the wheel to the frame 16 on stub shaft 39. The disc has a furrow facing side 40 which faces the furrow. The furrow facing side is provided with a series of radially extending scallops or cavities 42 that extend to the inner circumferential edge 43 of the disc. The radially extending scallops or cavities 42 form a wavy or castellated circumferential edge 43.

A circumferential surface 44 is located between the inner wavy circumferential edge 43 and the outer circumferential edge 45. The circumferential surface 44 is bevelled away from the furrow facing side to form a sharper contact edge with the soil, as illustrated in FIG. 2.

The invention should not be limited to the above-described embodiments, but should be limited solely by the claims that follow.

We claim:

1. A closing wheel for closing a furrow formed by an agricultural seeding machine, the closing wheel comprising:

a circular disc having a central aperture, an inner circumferential edge, a circular outer circumferential edge, and a furrow facing side, the central aperture being for rotatively mounting the closing wheel on a bearing assembly, the furrow facing side adjacent to the inner circumferential edge is provided with a series of radially extending scallops thereby making the inner circumferential edge wavy, the inner circumferential edge and the outer circumferential edge defining a circumferential surface that is beveled away from the furrow facing side.

2. An agricultural seeding machine for applying seeds to a field, the seeding machine comprising:

a frame;

a seed meter mounted to the frame for controlling the rate at which seeds are applied to a field;

a furrow opener mounted to the frame for opening a furrow to which seeds are applied from the seed meter;

a pair of closing wheels located behind the furrow opener for closing the furrow formed by the furrow opener, each closing wheel is provided with a furrow facing side that is provided with a series of radially extending scallops that extend to an inner wavy circumferential edge, each closing wheel is also provided with a circular outer circumferential edge, a circumferential surface is located between the inner circumferential edge and the outer circumferential edge.

3. An agricultural seeding machine as defined by claim 2 wherein the circumferential surface is beveled away from the furrow facing side.

4. A closing wheel for closing a furrow formed by an agricultural seeding machine, the closing wheel comprising:

a circular disc having a central aperture, an inner circumferential edge, a circular outer circumferential edge and a furrow facing side, the central aperture being for rotatively mounting the closing wheel on a bearing assembly, the furrow facing side adjacent to the inner circumferential edge is provided with a series of radially extending cavities forming a castellated inner circumferential edge, the castellated inner circumferential edge and the circular outer circumferential edge define a circumferential surface that is beveled away from the furrow facing side.

5. An agricultural seeding machine for applying seeds to a field, the seeding machine comprising:

a frame;

a seed meter mounted to the frame for controlling the rate at which seeds are applied to a field;

a furrow opener mounted to the frame for opening a furrow to which seeds are applied from the seed meter;

a pair of closing wheels located behind the furrow opener for closing the furrow formed by the furrow opener, each closing wheel is provided with a furrow facing side that is provided with a series of radially extending cavities that extend to an inner castellated circumferential edge, a circumferential surface is formed between the castellated inner circumferential edge and an outer circular circumferential edge.

6. An agricultural seeding machine as defined by claim 5 wherein the circumferential surface is beveled away from the furrow facing side.

* * * * *